US008977928B2

(12) United States Patent
Premke et al.

(10) Patent No.: US 8,977,928 B2
(45) Date of Patent: Mar. 10, 2015

(54) APPARATUS AND METHOD FOR RECEIVING A SECURE TELEGRAM

(71) Applicant: Siemens Aktiengesellschaft, Munich (DE)

(72) Inventors: Markus Premke, Regensburg (DE); Bernhard Wiesgickl, Vilseck (DE)

(73) Assignee: Siemens Aktiegesellschaft, Munich (DE)

( * ) Notice: Subject to any disclaimer, the term of this patent is extended or adjusted under 35 U.S.C. 154(b) by 63 days.

(21) Appl. No.: 13/627,110

(22) Filed: Sep. 26, 2012

(65) Prior Publication Data

US 2013/0080846 A1 Mar. 28, 2013

(30) Foreign Application Priority Data

Sep. 28, 2011 (EP) .................................... 11183134

(51) Int. Cl.
H03M 13/00 (2006.01)
H04L 1/00 (2006.01)
H04L 1/20 (2006.01)

(52) U.S. Cl.
CPC ................ H04L 1/0011 (2013.01); H04L 1/20 (2013.01)
USPC .............. 714/758; 714/E11.04; 714/E11.004; 714/704

(58) Field of Classification Search
USPC .................... 714/758, E11.04, E11.004, 704; 340/9.1; 375/227; 455/453
See application file for complete search history.

(56) References Cited

U.S. PATENT DOCUMENTS

| 2004/0015603 | A1 | 1/2004 | Griessbach et al. | |
|---|---|---|---|---|
| 2005/0249112 | A1* | 11/2005 | Barthel et al. | 370/216 |
| 2006/0253277 | A1 | 11/2006 | Behringer | |
| 2009/0003426 | A1* | 1/2009 | Isenmann | 375/227 |
| 2009/0043939 | A1* | 2/2009 | Fuessl et al. | 710/305 |
| 2010/0273503 | A1* | 10/2010 | Tiedemann et al. | 455/453 |
| 2011/0279231 | A1* | 11/2011 | Schwenkel | 340/9.1 |

FOREIGN PATENT DOCUMENTS

| DE | 19951451 A1 | 4/2001 |
|---|---|---|
| EP | 1494100 A1 | 1/2005 |
| EP | 2009834 A2 | 12/2008 |

* cited by examiner

Primary Examiner — Albert Decady
Assistant Examiner — Kyle Vallecillo
(74) Attorney, Agent, or Firm — Harness, Dickey & Pierce, P.L.C.

(57) ABSTRACT

An apparatus includes a communication device and an evaluation unit, wherein the communication device can be linked to a communication bus and can receive secure telegrams by way of the communication bus, and wherein a secure telegram includes user data and CRC data in each instance. In at least one embodiment, in order to improve the communication within the secure bus system, the evaluation unit can determine an error rate from received secure telegrams by way of a CRC check and if a threshold value of the error rate stored in the evaluation unit is exceeded, can effect a secure state of the apparatus.

10 Claims, 1 Drawing Sheet

APPARATUS AND METHOD FOR RECEIVING A SECURE TELEGRAM

PRIORITY STATEMENT

The present application hereby claims priority under 35 U.S.C. §119 to European patent application number EP 11183134.3 filed Sep. 28, 2011, the entire contents of which are hereby incorporated herein by reference.

FIELD

At least one embodiment of the invention generally relates to an apparatus and/or method for receiving a secure telegram on a communication bus of a bus system. In at least one embodiment, the bus system may be in particular a secure bus system within industrial automation technology, such as for instance the PROFIsafe bus system or AS-i Safety at Work bus system. In at least one embodiment, the apparatus may be in particular an electrical device (bus subscriber) of the secure bus system, which can be connected hereto for communication with at least one further device (bus subscriber) by way of a communication bus of the bus system.

BACKGROUND

Two devices are usually connected to one another by way of the communication bus for communication within a bus system. The respective device here has a communication device, by which it is linked to the communication bus. Telegrams can be exchanged between the participating devices by way of the communication bus via the communication device of the respective device, so that an exchange of information can take place between the devices. The devices can subsequently receive telegrams from the communication bus by way of its communication device and send telegrams to the communication bus.

Information to be transmitted (e.g. measured values, states and/or parameters) of the devices is usually transmitted as user data via the communication bus. A defined number of bits can be transmitted per telegram as a function of the bus system used (e.g. PROFIBUS, AS-i Bus). A defined number of bits for the user data is thus available to the devices for transmission of information per telegram. A maximum of 10 bits of user data can be transmitted by means of a telegram for instance and the information to be transmitted requires 40 bits of user data, so at least 4 telegrams are needed to transmit the information, since a maximum of 10 bits of the user data mapping part of the information can be transmitted per telegram.

Where the devices are used within safety technology, in particular within industrial safety technology, the relevant devices and the communication of the devices with one another must fulfill special security regulations In particular, the communication of the devices must take place by way of secure telegrams. Secure bus systems are usually set up on the respective "standard" bus system and safeguard the user data to be transmitted securely, e.g. by way of a cyclic redundancy check. The cyclic redundancy check (CRC) is a method for determining a test value for data in order to be able to identify errors in the transmission. Aside from the user data, CRC data is herewith transmitted within a secure telegram. A CRC value of the user data of the respective secure telegram is mapped by means of the CRC data. The CRC value and finally the CRC data are generated on the part of the sending device by a CRC calculation method, so that a secure telegram can be sent with user data and CRC data.

In the embodiments of this application, a secure telegram to be sent is always based on a maximum possible quantity of user data per secure telegram. It is evident that upon transmission of a lower quantity of user data in the secure telegram compared with the maximum quantity of user data per secure telegram, a lower number of bits for CRC data is required per telegram. In the description of this application, provided reference is not explicitly made thereto, the maximum possible quantity of user data in a secure telegram is always considered (in particular transmitted or received).

If a secure telegram is received by an apparatus, the user data and CRC data are initially determined from the received secure telegram. A CRC check is then carried out, in which the CRC data is adjusted to the user data. The user data of the received secure telegram is then herewith checked for correctness with the CRC value mapped by the CRC data. The correct transmission of the user data by means of the secure telegram can thus be checked by means of the CRC check.

As a function of the secure bus system used, a defined number of bits for the user data and CRC data is available to the apparatus for transmitting the information per secure telegram. If 20 bits for the user data and CRC data are available for instance per telegram and 12 bits of CRC data are required to map the CRC value of the user data of a telegram, only 8 bits of user data can be securely transmitted per telegram.

The number of bits required for the CRC data of a secure telegram is dependent on the quantity of user data to be transmitted, the user data width (number of bits for CRC data and user data per secure telegram) of the secure telegram and on the CRC calculation method applied to the user data to be transmitted of the secure telegram to be sent.

The user data width of a bus system is usually fixedly predetermined. The CRC calculation method to be applied is thus currently determined on the basis of a bit error probability to be expected for the communication via the communication bus. As a function of the present communication bus, the bit error probability to be expected of the communication bus can be calculated by taking the communication bus into consideration. A minimal bit quantity of CRC data required per secure telegram to be sent results from this determined bit error probability to be expected of the communication bus, in order to ensure a secure communication via the communication bus.

This determined minimal bit quantity of CRC data per secure telegram to be sent is currently used to safeguard the secure communication on the communication bus. The criteria of a secure communication in the industrial field are defined for instance in the standards IEC 61508 or ICE 62061.

The CRC calculation method of apparatuses, which can send secure telegrams by way of the communication bus, is therefore usually configured such that with a secure telegram to be sent comprising the user data, so much CRC data is constantly formed that at least the minimal bit quantity of CRC data required is available. The CRC check associated therewith can thus already ensure in this way that a secure communication takes place by way of the communication bus. During secure communication by way of the communication bus, the CRC calculation method is thus only determined as a function of the determined bit error probability to be expected of the communication bus. The bit quantity of CRC data for transmission of the user data per secure telegram is thus currently very high.

A fixed user data width (maximum bit quantity of user data and CRC data per telegram) is usually available per secure telegram to be sent. The bit quantity of CRC data for transmission of the maximum quantity of user data of the secure telegram can subsequently be uniquely determined in order to transmit a secure telegram. In the case of AS-i Safety at Work, the bit error probability of the communication bus is 3*10−3 and the user data width per secure telegram is 16 bits. A maximum of 4 bits of user data per secure telegram can thus be transmitted, which are "secured" with 12 bits of CRC data. The minimal bit quantity of CRC data required is thus 12 bits with AS-i Safety at Work.

In the case of PROFIsafe, the bit error probability of the communication bus is 1*10−2. If the user data width is 3 bytes for a secure telegram, the minimal quantity of CRC data required is 3 bytes. If the user data width is 123 bytes for a secure telegram, the minimal quantity of CRC data required is 4 bytes.

SUMMARY

At least one embodiment of the present invention is directed to improving the communication within a secure bus system. In particular, the transmission of user data is to be improved. An accelerated transmission of information to be transmitted as user data is herewith preferably to be enabled despite compliance with the valid security regulation(s) of the secure bus system. The secure bus system is preferably a secure industrial bus system.

At least one embodiment is directed to an apparatus for receiving a secure telegram, having a communication device and an evaluation unit, wherein the communication device can be linked to a communication bus and can receive secure telegrams by way of the communication bus, wherein a secure telegram includes user data and CRC data in each instance, wherein the evaluation unit can determine an error rate by way of a CRC check from the received secure telegrams and if a threshold value of the error rate stored in the evaluation unit is exceeded, can effect a secure state of the apparatus. At least one embodiment is directed to a method for receiving a secure telegram within a bus system, wherein a secure telegram includes user data and CRC data in each instance, wherein an apparatus connected to the bus system determines an error rate by means of a CRC check from its received secure telegrams, wherein if a threshold value of the error rate stored in the apparatus is exceeded, a secure state of the apparatus is affected.

Advantageous developments of the invention are specified in the dependent claims. A secure telegram differs from a non-secure telegram in that with the secure telegram, CRC data are transmitted within the telegram in addition to the user data. CRC data reproduces a CRC value of the user data of the secure telegram.

In a further advantageous embodiment of the invention, the apparatus is an electrical device within industrial automation technology and the secure telegrams are PROFIsafe or AS-i Safety at Work telegrams. The electrical device preferably monitors, protects and/or switches an electromotor.

In a further advantageous embodiment of the invention, the two apparatuses can exchange secure telegrams with one another by way of the communication bus. Both apparatuses can preferably determine an error rate with the aid of the received telegrams in each instance.

BRIEF DESCRIPTION OF THE DRAWINGS

The invention and embodiments of the invention are described and explained in more detail below with the aid of the exemplary embodiments shown in the figures, in which.

DETAILED DESCRIPTION OF THE EXAMPLE EMBODIMENTS

Figure 1:
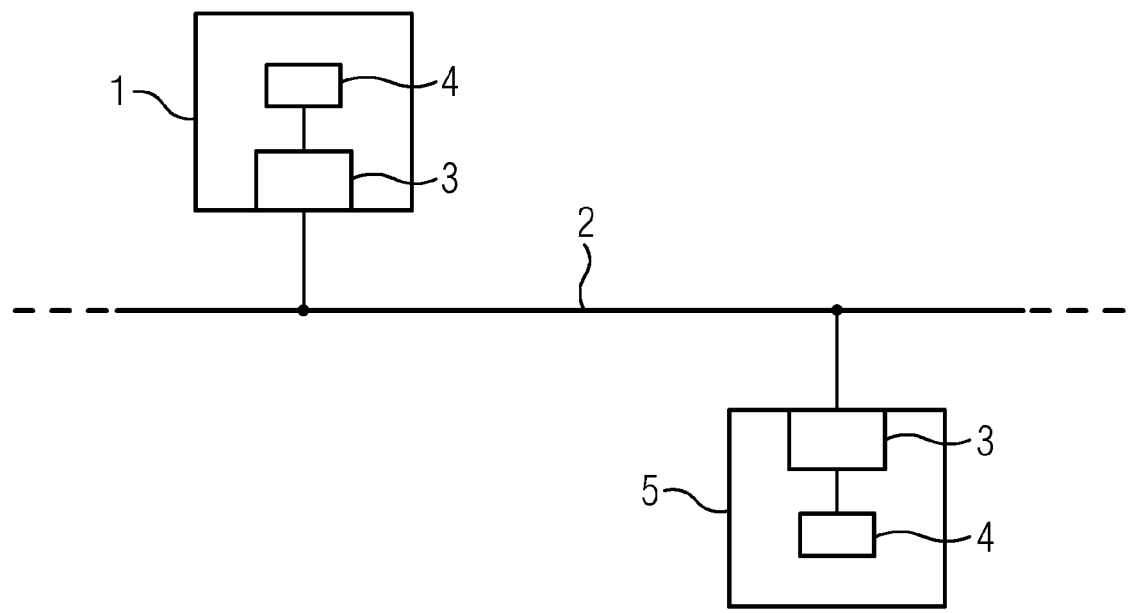
FIG. 1 shows a schematic representation of a secure bus system with a first apparatus as a master, a second apparatus as a slave and a communication bus.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The received user data is adjusted to the associated CRC value of the CRC data, which is transmitted with the user data per secure telegram, by means of the CRC check. The apparatus can subsequently identify by means of this adjustment whether or not a faulty transmission of the user data exists. Errors in the transmission of the user data by means of a telegram can be caused for instance by noises on the line of the communication bus.

An error rate with respect to the received telegrams can be determined by way of an evaluation of the CRC check of the received telegrams. If a faulty transmission of user data is identified by way of the CRC check, the error rate increases. The existing error rate can be determined for instance by means of an error counter, an evaluation of the determined error over time or an evaluation of the number of received secure telegrams compared with the faulty telegrams.

A threshold value relating to this error rate is stored in the evaluation unit of the apparatus. The threshold value is preferably embodied such that it characterizes the transition between the secure communication range, which can be referred to as a secure communication on the communication bus, and the non-secure communication range, which cannot be referred to as a secure communication on the communication bus. The determination of the ranges and thus the determination of the threshold value of the error rate preferably take place by taking the security regulations of the respective communication system into account. If the determined error rate subsequently lies below the threshold value, a secure communication exists. If the determined error rate is above the threshold value, no secure communication exists.

If, by way of the CRC check, an error is identified in the transmission of a secure telegram and if on account of the increase in the error rate resulting therefrom the threshold value is not exceeded, the secure telegram is rejected and no further processing of the user data of the faulty secure telegram takes place. If, conversely, after the CRC check the threshold value is exceeded on account of the increase in the error rate resulting therefrom, a secure state of the apparatus is affected. The secure state of the apparatus exists in particular if there is no risk on the part of the apparatus. A consumer controlled by the apparatus, which represents a risk during active operation, is switched off herefor.

As during secure communication via the communication bus an additional error evaluation is performed by the apparatus in respect of the communication via the communication bus, the CRC calculation method can be made "less welldefined" for the CRC value of the user data. The required quantity of CRC data for transmission of user data by means of a secure telegram can therefore be reduced compared with the required quantity with the current calculation method only on the basis of the bit error probability of the communication bus. More user data per secure telegram can therefore be transmitted and the valid security regulations can be complied with at the same time. An increased data throughput of user data compared with the current systems can therefore take place.

In accordance with the valid security standards, it is permissible to use a lower error detection and thus a lower bit quantity of CRC data per secure telegram to be sent if additional measures are taken. The determination of the error rate and adjustment of the existing error rate to the stored threshold value of the error rate by the evaluation unit is used for this purpose, so that for the purpose of a secure communication on the communication bus, a CRC calculation method can be applied, with which the bit quantity of CRC data of a secure telegram to be sent with a maximum user data quantity is lower than in conventional systems, which determine the CRC calculation method with the aid of the determined, calculated bit error probability of the communication bus used.

While complying with the valid security regulations, a larger quantity of user data can be transmitted in this way per secure telegram to be transmitted.

In an advantageous embodiment of the invention, the apparatus can send secure telegrams via the communication bus, wherein the apparatus can form associated CRC data of the secure telegram to be sent by way of a CRC calculation method stored in the apparatus comprising user data of a secure telegram to be sent, wherein, as a function of the communication bus used, a bit error probability to be expected for the communication by way of the communication bus can be calculated, wherein solely by taking the calculated bit error probability to be expected of the communication bus used into account, a minimal bit quantity of CRC data required results per secure telegram to be sent, in order to ensure a secure communication via the communication bus, wherein the CRC calculation method stored in the apparatus is embodied such that the bit quantity of CRC data is greater for a telegram to be sent than half of the minimal bit quantity required and lower than the minimal bit quantity required.

The bit error probability (BEP) describes a probability calculated by theoretical considerations for the occurrence of a bit error. Closed calculations of bit error probabilities are in most instances only possible for idealized scenarios, but are frequently used to replace complicated simulations and to determine limits in the performance of telecommunication systems.

Each standard bus system implements security mechanisms, in order to ensure the quality of the data (e.g. AS-i Safety at Work or PROFIsafe). These security mechanisms are found in the applied CRC calculation method. The CRC calculation method in these systems is currently only determined on the basis of the calculated bit error probabilities to be expected of the corresponding communication bus. The minimal bit quantity of CRC bit data required for a secure telegram to be sent with a maximum quantity of user data was herewith determined by means of the theoretically determined bit error probability to be expected of the communication bus used. The CRC calculation method within the bus system was thus embodied such that the CRC value of a secure telegram to be sent comprises at least the minimal bit quantity of CRC data required. Since, by applying a CRC calculation method, in which at least the minimal quantity of CRC data per secure telegram determined on the basis of the bit error probabilities of the corresponding communication bus is formed, the relevant security regulations are fulfilled, no further evaluations are needed to ensure a secure communication within the communication bus.

With AS-i Safety at Work, 12 bits of CRC data would be necessary to transmit a secure telegram with a maximum quantity of user data. The minimal bit quantity of CRC data required is thus 12 bits with AS-i Safety at Work.

The bit quantity of user data available per secure telegram can conversely be increased by way of the additional evaluation of the determined error rate and the adjustment of the existing error rate to the threshold value. By virtue of determining the error rate, the CRC calculation method can therefore be adjusted such that in spite of complying with the security regulations, the largest possible number of bits of user data can be transmitted per secure telegram.

In a further advantageous embodiment of the invention, the apparatus is an electrical device within industrial automation technology and the secure telegrams are PROFIsafe or AS-i Safety at Work telegrams. The electrical device preferably monitors, protects and/or switches an electromotor.

In a further advantageous embodiment of the invention, the two apparatuses can exchange secure telegrams with one another by way of the communication bus. Both apparatuses can preferably determine an error rate with the aid of the received telegrams in each instance.

FIG. 1 shows a schematic representation of a secure bus system having a first apparatus 1 as a master, a second apparatus 5 as a slave and a communication bus 2. The bus system under consideration is a bus system in the field of industrial automation technology, in this example an AS-i Safety at Work bus system. The first apparatus 1 as a master can control the communication within the AS-i Safety at Work bus system. The first apparatus 1 can send secure telegrams via the communication bus 2 and selectively address the second apparatus 5. The second apparatus 5 can receive the secure telegram addressed thereto and hereupon sends a secure telegram to the first apparatus 1. The first apparatus 1 can receive this secure telegram again. The two apparatuses 1, 5 can subsequently communicate with one another. Both the sent and also the received secure telegram includes user data and CRC data.

Both the first and also the second apparatus 1, 5 can send a secure telegram to the communication bus 2 by way of its communication device 3 and receive a secure telegram from the communication bus 2. The respective communication device 3 is connected in each instance to an evaluation unit 4, by means of which a CRC calculation for secure telegrams to be sent and an evaluation, in particular a CRC check, of the received secure telegrams can take place.

The CRC data of the secure telegram defines a CRC value of the user data transmitted in the same secure telegram. By way of this CRC value, the apparatus 1, 5 which receives the secure telegram checks by means of the CRC check whether or not the user data sent via the secure telegram arrived correctly within the apparatus. This CRC check takes place in the evaluation unit 4 of the respective apparatus 1, 5.

Furthermore, the respective evaluation unit 4 can determine an error rate, which characterizes the faulty receipt of user data of received secure telegrams (currently existing error rate). The respective evaluation unit 4 of the apparatuses 1, 5 therefore constantly determines a currently existing error rate from the received telegrams. The error rate is formed for instance by an error counter. The error rate increases if the CRC check detects an error in the user data of a received, secure telegram.

The frequency of errors in respect of the received, secure telegrams is consequently reflected by means of the error rate. With a high error rate, more errors are detected by the evaluation unit 4 in the CRC check compared with a lower error rate.

A threshold value for the error rate is also stored in the respective evaluation unit 4. This threshold value of the error rate characterizes the range from which a secure communication exists and/or no longer exists. If the threshold value of the error rate is exceeded by the currently existing determined error rate of the apparatus, it is assumed that no secure communication exists. If the threshold value of the error rate is not reached by the currently existing determined error rate of the apparatus, it is assumed herefrom that a secure communication exists. If the threshold value is subsequently exceeded, a signal is output by the evaluation unit so that a secure state of the apparatus can be affected by the apparatus. The threshold value of the error rate stored in the evaluation unit 4 controls whether or not a secure communication exists on the communication bus.

The logical processing within the respective evaluation unit 4 takes place in particular by way of a microcontroller.

This additional evaluation of the secure communication within a bus system enables, while complying with the valid security regulations, a "weakening" of the CRC calculation method so that less CRC data is required. Compared with the conventional systems (in which the CRC calculation method is only determined on the basis of the probability of the communication bus), less CRC data is consequently needed to map a CRC value of user data than with the conventional CRC calculation method. Since the user data width of a secure telegram is fixedly determined, more user data per secure telegram can thus be transmitted. In the case of a telegram to be sent, a larger bit quantity of user data can consequently be transmitted with a lower bit quantity of CRC data than with the conventional secure telegrams and yet requirements in terms of the valid security standards are complied with since an additional evaluation of the communication takes place by way of the adjustment of the existing error rate to the threshold value of the error rate.

In order to send information to be transmitted from the first apparatus 1 to the second apparatus 5 (or vice versa), the information to be transmitted is mapped as user data. A specific number of bits of user data is required herefor as a function of the information to be transmitted. Since only a specific data width for the user data and CRC data is available within the AS-i Safety at Work bus system per telegram, a number of telegrams is required to transmit information. With AS-i Safety at Work, a data width of 16 bits exists for the user data and CRC data. Only 16 bits of user data and CRC data can therefore be transmitted per telegram. If, in order to fulfill the valid security regulations, the CRC calculation method is only set up on the basis of a calculated bit error probability to be expected of the AS-i communication bus used, a minimal bit quantity of CRC data required is produced for a secure telegram to be sent. This minimal bit quantity of CRC data is 12 bits. This is the minimal bit quantity of CRC data required per secure telegram to be sent, in order to ensure a secure communication by way of the communication bus. A CRC value which requires 12 bits of CRC data is therefore needed to securely transmit 4 bits of user data. The CRC value of the user data transmitted in the secure telegram is mapped completely by the 12 bit CRC data transmitted at the same time as the secure telegram. For secure transmission of information, only 4 bits of user data can therefore be transmitted per secure telegram.

Within AS-i Safety at Work, it is permissible not to reach the minimal bit quantity of CRC data required per secure telegram to be sent by means of the bit error probability if additional security mechanisms are used. This is achieved by adjusting the threshold value to the present error rate of the received secure telegram.

A CRC calculation method is preferably applied, in which for a telegram to be sent the bit quantity of CRC data is preferably larger than half of the minimal bit quantity required and lower than the minimal bit quantity required. Since faulty bits can be detected in the user data with a very high probability by means of the CRC check of the receiving secure telegrams, the evaluation unit 4 can determine the present error rate adequately (according to the valid security regulations). As a result of the evaluation unit 4 being able to determine an existing error rate adequately, an adjustment of the CRC calculation method can take place while simultaneously complying with the security regulations, if the error rate is additionally taken into account. This is achieved by means of the threshold value.

A CRC calculation method can therefore be applied for instance in AS-i Safety at Work, with which in order to send a secure telegram only 8 bits of CRC data are needed to securely transmit 8 bits of user data. The CRC value of the user data transmitted in the secure telegram is completely mapped by the CRC data transmitted at the same time as the secure telegram. A corresponding configuration of the applied threshold value provides to compensate for the change in the CRC calculation method, so that the requirements in terms of safety technology are consequently fulfilled.

Similarly, with AS-i Safety at Work, a CRC calculation method can be applied for instance, with which in order to send a secure telegram only 6 bits of CRC data are needed to securely transmit 10 bits of user data. The CRC value of the user data transmitted in the secure telegram is fully mapped by the CRC data transmitted at the same time as the secure telegram. A corresponding configuration of the applied threshold value provides to compensate for the change in the CRC calculation method, so that the requirements in terms of safety technology are nevertheless fulfilled.

By reducing the threshold value in the error rate, a lower bit quantity of CRC data can therefore be determined per secure telegram.

If a secure telegram is sent for instance from the first apparatus 1 to the second apparatus 2, a CRC value is initially calculated by the CRC calculation method fixedly stored in the evaluation unit 4 of the first apparatus 1 for the user data to be transmitted within the secure telegram. This CRC value is mapped by CRC data, which is sent with the user data to be transmitted to the communication bus 2 in the same secure telegram. The second apparatus 5 can receive the secure telegram by way of its communication device 3. The process sequence of a subsequent analysis of a received secure telegram by the second apparatus 5 is shown schematically in FIG. 2.

Figure 2:
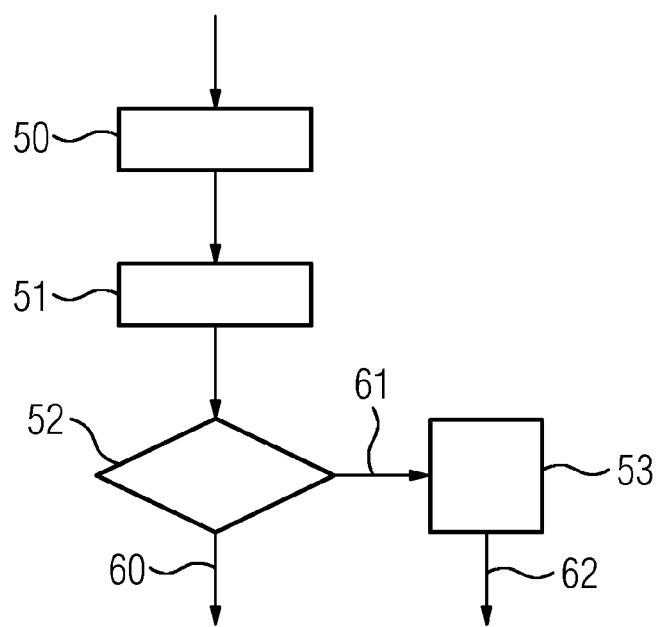
FIG. 2 shows a schematic representation of a possible process sequence of an evaluation of a secure telegram by the second apparatuses from FIG. 1.

FIG. 2 shows a schematic representation of a possible process sequence of an evaluation of a secure telegram by the second apparatuses 5 from FIG. 1. The first apparatus initially sends a secure telegram via the communication bus to the second apparatus.

In a first step 50, this secure telegram is received by the communication bus by means of the communication device of the second apparatus, so that the secure telegram is available to the second apparatus.

In a subsequent second step 51, the received secure telegram is decoded and if necessary corrected by means of error protection mechanisms, so that the user data and the CRC data are available to the communication device.

In a subsequent third step 52, the user data and the CRC data of the decoded received secure telegram is passed on to the evaluation unit by the communication device. The CRC check now takes place within the evaluation unit. The CRC value, which is reproduced by the CRC data of the received telegram, is herewith adjusted to the user data of the received telegram. The evaluation unit can subsequently identify whether or not the transmission of user data from the first apparatus to the second apparatus is error-free.

If the received user data matches the CRC value of the received CRC data, i.e. the transmission of the user data was correct, the user data is passed on for further processing. This is shown with arrow 60.

If the received user data does not match the CRC value, the received user data of the secure telegram is rejected. Furthermore, the evaluation unit is informed of a faulty transmission of user data. This is shown with arrow 61.

In the event of a faulty transmission of user data, a fourth step 53 ensues. Since a faulty transmission exists, the evaluation unit is informed of the error. Within the evaluation unit, the error rate, which characterizes the faulty receipt of user data of received secure telegrams, is updated (increased). The updated existing error rate is now compared with the stored threshold value of the error rate. If the threshold value is not met, no further measures take place. If however the threshold value is exceeded by the updated existing error rate, a secure state of the apparatus is affected. This is shown with arrow 62.

The error rate is determined after the CRC check of the user data of the received telegrams. The existing error rate can be calculated differently. Evaluations of the faulty user data by way of its quantity, proportionately to the number of received telegrams or the number of correctly received telegrams, are in particular conceivable.

The error rate is preferably reset at predetermined intervals, so that the error counting is begun anew. A new determination of the existing error rate can take place for instance after a determined time interval, a specific number of secure telegrams, a specific quantity of correctly received user data etc.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magnetooptical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for receiving a secure telegram, comprising:
    a communication device, configured to be linked to a communication bus and configured to receive secure telegrams by way of the communication bus, wherein each of the secure telegrams includes user data and cyclic redundancy check (CRC) data; and
    an evaluation unit, configured to determine an error rate by way of a CRC check from received secure telegrams and configured to, upon a threshold value of the error rate stored in the evaluation unit being exceeded, affect a secure state of the apparatus, wherein
        the apparatus is configured to send secure telegrams via the communication bus, wherein the apparatus is configured to form associated CRC data of the secure telegrams to be sent by way of a CRC calculation method stored in the apparatus comprising user data of a secure telegram to be sent, wherein a bit error probability to be expected for the communication by way of the communication bus is calculable as a function of the communication bus used, wherein a minimal bit quantity of CRC data required per secure telegram to be sent results only by taking the calculated bit error probability to be expected of the communication bus used into account, in order to ensure a secure communication via the communication bus, and wherein the CRC calculation method stored in the apparatus is embodied such that for a telegram to be sent, the bit quantity of CRC data is between greater than half of a minimal bit quantity required and lower than the minimal bit quantity required.

2. The apparatus of claim 1, wherein the apparatus is an electrical device within industrial automation technology and wherein the secure telegrams are PROFIsafe or AS-i Safety at Work telegrams.

3. A bus system comprising:
    a communication bus; and
    two apparatuses each of which include a communication device, configured to be linked to the communication bus and configured to receive secure telegrams by way of the communication bus, wherein each of the secure telegrams includes user data and cyclic redundancy check (CRC) data; and
    an evaluation unit, configured to determine an error rate by way of a CRC check from received secure telegrams and configured to, upon a threshold value of the error rate stored in the evaluation unit being exceeded, affect a secure state of the apparatus, wherein
        the apparatus is configured to send secure telegrams via the communication bus, wherein the apparatus is configured to form associated CRC data of the secure telegrams to be sent by way of a CRC calculation method stored in the apparatus comprising user data of a secure telegram to be sent, wherein a bit error probability to be expected for the communication by way of the communication bus is calculable as a function of the communication bus used, wherein a minimal bit quantity of CRC data required per secure telegram to be sent results only by taking the calculated bit error probability to be expected of the communication bus used into account, in order to ensure a secure communication via the communication bus, and wherein the CRC calculation method stored in the apparatus is embodied such that for a telegram to be sent, the bit quantity of CRC data is between greater than half of a minimal bit quantity required and lower than the minimal bit quantity required, and wherein the two apparatuses secure telegrams are exchangeable between the two apparatuses by way of the communication bus.

4. A method for receiving secure telegrams within a bus system, the secure telegrams each including user data and cyclic redundancy check (CRC) data, the method comprising:
    determining, via an apparatus connected to the bus system, an error rate from the received secure telegrams by way of a CRC check; and
    affecting, upon a threshold value of the error rate stored in the apparatus being exceeded, a secure state of the apparatus, wherein
        a bit error probability to be expected for the communication by way of the communication bus is calculable as a function of the communication bus used, wherein a minimal bit quantity of CRC data required per secure telegram to be sent only results by taking the calculated bit error probability expected of the communication bus used into consideration, in order to ensure a secure communication by way of the communication bus, and wherein a CRC calculation method is stored in the apparatus, with which the bit quantity of CRC data for a telegram to be sent is between greater than half of a minimal bit quantity required and lower than the minimal bit quantity required.

5. The method of claim 4, wherein the received and sent telegram together provide a fixed number of bits for the user data and CRC data in each instance.

6. The apparatus of claim 1, wherein the apparatus is an electrical device within industrial automation technology and wherein the secure telegrams are PROFIsafe or AS-i Safety at Work telegrams.

7. The apparatus of claim 1, wherein the received and sent telegram each include a fixed number of bits for the user data and CRC data in each instance.

8. A non-transitory computer readable medium including program segments for, when executed on a computer device, causing the computer device to implement:
    determining, via an apparatus connected to the bus system, an error rate from the received secure telegrams by way of a CRC check; and
    affecting, upon a threshold value of the error rate stored in the apparatus being exceeded, a secure state of the apparatus, wherein
        a bit error probability to be expected for the communication by way of the communication bus is calculable as a function of the communication bus used, wherein a minimal bit quantity of CRC data required per secure telegram to be sent only results by taking the calculated bit error probability expected of the communication bus used into consideration, in order to ensure a secure communication by way of the communication bus, and wherein a CRC calculation method is stored in the apparatus, with which the bit quantity of CRC data for a telegram to be sent is between greater than half of a minimal bit quantity required and lower than the minimal bit quantity required.

9. The apparatus of claim 1, wherein the secure telegram has a fixed bit length and a number of bits allocated to the CRC data is more than half the minimal bit quantity required and less than the minimal bit quantity required.

10. The method of claim 4, wherein receiving the secure telegram includes receiving a telegram of a fixed bit length having a number of bits allocated to the CRC data is more than half the minimal bit quantity required and less than the minimal bit quantity required.

\* \* \* \* \*